United States Patent
Bian et al.

(10) Patent No.: US 6,845,914 B2
(45) Date of Patent: Jan. 25, 2005

(54) METHOD AND SYSTEM FOR VERIFYING TRANSITIONS BETWEEN CONTRASTING ELEMENTS

(75) Inventors: Long Xiang Bian, Sharon, MA (US); Walter P. Sweeney, Jr., Stoughton, MA (US)

(73) Assignee: Sick Auto Ident, Inc., Canton, MA (US)

( * ) Notice: Subject to any disclaimer, the term of this patent is extended or adjusted under 35 U.S.C. 154(b) by 0 days.

(21) Appl. No.: 10/382,807

(22) Filed: Mar. 6, 2003

(65) Prior Publication Data

US 2004/0173683 A1 Sep. 9, 2004

(51) Int. Cl.[7] .............................................. G06K 7/10
(52) U.S. Cl. ................................................. 235/462.16
(58) Field of Search ..................... 235/462.16; 382/169, 382/172

(56) References Cited

U.S. PATENT DOCUMENTS

| | | | | |
|---|---|---|---|---|
| 5,270,525 A | * | 12/1993 | Ukai et al. ............. | 235/462.16 |
| 5,457,309 A | | 10/1995 | Pelton | |
| 5,979,763 A | * | 11/1999 | Wang et al. ........... | 235/462.17 |
| 6,036,091 A | | 3/2000 | Spitz | |
| 6,328,213 B1 | * | 12/2001 | He et al. ............... | 235/462.25 |
| 6,513,714 B1 | * | 2/2003 | Davis et al. ........... | 235/462.16 |
| 2002/0023958 A1 | | 2/2002 | He et al. | |
| 2003/0066890 A1 | * | 4/2003 | Shaked et al. ......... | 235/462.01 |

FOREIGN PATENT DOCUMENTS

EP     1 150 240 A2     10/2001

OTHER PUBLICATIONS

Joseph, Eugene; Pavlidis, Theo, *Bar Code Waveform Recognition Using Peak Locations*, IEEE Transactions on Pattern Analysis and Machine Intelligence, vol. 16, No. 6, Jun. 1994, pp. 630–640.

* cited by examiner

*Primary Examiner*—Mark Tremblay
(74) *Attorney, Agent, or Firm*—Iandiorio & Teska

(57) ABSTRACT

A method and system for verifying readings of contrasting elements such as bar code elements includes generating a profile of the contrasting elements; identifying a first zone of values representing a first contrasting element, a second zone of values representing a second contrasting element, and a working zone of values representing transitions between contrasting elements; detecting a change in the bar code profile indicative of an apparent transition between the contrasting elements and confirming the apparent transition as a true transition if it occurs in the working zone and rejecting it if it occurs in the first or second zones.

24 Claims, 7 Drawing Sheets

METHOD AND SYSTEM FOR VERIFYING TRANSITIONS BETWEEN CONTRASTING ELEMENTS

FIELD OF THE INVENTION

This invention relates to a method and system for verifying transitions between contrasting elements such as bar code bars and spaces.

BACKGROUND OF THE INVENTION

An important part of reading bar codes is identifying the transitions between bar code elements such as bars and spaces. Ideally, the transition would be clean and abrupt and easy to detect. More realistically, the transition is in an area of gray and its location is critical because on it depends the determination of the width of the bar code elements, the bars and spaces. In a typical bar code using black bars and white spaces the transitions would never occur in the black or in the white levels which clearly represent the bars and spaces but in the gray areas between them. But often there does occur apparent transitions in those black and white levels which, when detected as transitions, give false readings of the widths and number of the associated bars and spaces. One approach has been to simply set a threshold level in the gray scale profile above which is considered white, below which is considered black. This works if the bar code signal is sharp and the bars and spaces are large enough so that a high level of black or white is attained. That is, the gray transition areas are small compared to the full black or white of the bars or spaces and the bar or space reaches, at least in its middle portion, a level of white or black which is beyond the threshold. However, when the bars and spaces are small, the middle portion shrinks and the gray transition areas encroach on the bar or space itself so that even though it is actually black or white it appears as mostly gray and does not exceed the threshold and so is not read correctly. One attempt to overcome this uses a floating threshold level but this too can produce errors.

BRIEF SUMMARY OF THE INVENTION

It is therefore an object of this invention to provide an improved method and system of verifying contrasting elements such as bar code elements.

It is a further object of this invention to provide such an improved method and system which reduces noise and produces more accurate readings of contrasting elements such as bar code elements.

It is a further object of this invention to provide such an improved method and system of verifying readings of contrasting elements such as bar code elements by increasing the reliability of transition recognition.

The invention results from the realization that improved, faster, more accurate and reliable bar code reading can be achieved by sorting the values derived from the gray scale profile of the scan of the bar code into bar values, space values and working zone values where transitions occur, then confirming only transition that appear in the working zone and rejecting those that appear elsewhere, which results in rejecting bar values that occur in the space zone and, conversely, by rejecting space values that occur in the bar zone.

This invention features a method of verifying bar code readings including generating a profile of a bar code and identifying a bar zone of values representing bars, a space zone of values representing spaces, and a working zone of values representing the transitions between the bars and spaces. The method also includes detecting a change in the bar code profile indicative of an apparent transition and confirming the apparent transition as a true transition if it occurs in the working zone and rejecting it if it occurs in the bar or space zone.

In a preferred embodiment the method may further include detecting a portion of a bar code profile indicative of a bar and rejecting it as a bar if it occurs in the space zone and further detecting a portion of a bar code profile indicative of a space and rejecting it as a space if it occurs in the bar zone. The profile may be a grayscale profile. Detecting a change in the bar code profile indicative of an apparent transition may include sensing first and second successive slope reversals and defining the apparent transition midway between the slope reversals. Identifying a bar zone, space zone and working zone may include generating a histogram of the gray scale distribution of the profile and classifying bar zone values, space zone values and working zone values corresponding to the histogram distribution. Identifying a bar zone, space zone and work zone may include establishing the limits of the range of the bar and space values and defining the working zone as a portion of that range.

This invention also features a method of verifying readings of contrasting elements including generating a profile of the contrasting elements and identifying for each type of contrasting element a zone of values representative thereof and a working zone of values representing transitions between contrasting elements. The method further includes detecting a change in the profile indicative of an apparent transition between the contrasting elements and confirming the apparent transition as a true transition if it occurs in the working zone and rejecting it if it occurs in any other zone.

In a preferred embodiment, the method may further include detecting a portion of a profile indicative of a first contrasting element and rejecting it if it occurs in the second zone and detecting a portion of a profile indicative of a second contrasting element and rejecting it if it occurs in the first zone. The profile may be a grayscale profile. Detecting a change in the bar code profile indicative of an apparent transition may include sensing first and second successive slope reversals and defining the apparent transition midway between the slope reversals. Identifying a working zone may include using the histogram, the intensity value distribution, from the profile and classifying working zone values corresponding to the histogram. Identifying a working zone may include establishing the limits of the range of the first contrasting element values and defining the working zone as a portion of that range.

This invention also features a system for verifying bar code readings, including means for generating a profile of a bar code and means for identifying a bar zone of values representing bars, a space zone of values representing spaces, and a working zone of values representing the transitions between the bars and spaces. There are means for detecting a change in the bar code profile indicative of an apparent transition and means for confirming the apparent transition as a true transition if it occurs in the working zone and rejecting it if it occurs in the bar or space zone.

In a preferred embodiment, the means for detecting a portion of the bar code profile may detect a portion of a bar code profile indicative of a bar and reject it as a bar if it occurs in the space zone and may detect a portion of a bar code profile indicative of a space and reject it as a space if it occurs in the bar zone. The means for generating a profile may generate a gray scale profile. The means for detecting a change in the bar code profile indicative of an apparent transition may include means for sensing first and second slope reversals and means for defining the apparent transition midway between the slope reversals. The means for identifying a bar zone, space zone, and working zone may include means for generating a histogram distribution from the profile values and identifying bar zone values, space zone values, and working zone values corresponding to the histogram distribution. The means for identifying a bar zone, space zone, and working zone may include means for establishing the limits of the range of bar and space values and defining the working zone as a portion of that range.

This invention also features a system for verifying readings of contrasting elements including means for generating a profile of contrasting elements and means for identifying a first zone of values representing a first contrasting element, a second zone of values representing a second contrasting element, and a working zone of values representing transitions between the contrasting elements. There are means for detecting a change in the profile indicative of an apparent transition between the contrasting elements and means for confirming the apparent transition as a true transition if it occurs in the working zone, and rejecting it if it occurs in the first or second zones.

In a preferred embodiment, the means for detecting may detect a portion of a profile indicative of a first contrasting element and reject it as a first contrasting element if it occurs in the second zone. The means for detecting may detect a portion of a profile indicative of a second contrasting element and reject it as a second contrasting element if it occurs in the first zone. The profile may be a grayscale profile. The means for detecting a change in the bar code profile indicative of an apparent transition may include means for sensing first and second successive slope reversals and means for defining apparent transitions midway between the slope reversals. The means for identifying a first zone, second zone, and working zone may include means for generating a histogram from the values of the profile and identifying first zone values, second values and working zone values corresponding to the histogram distribution. The means for identifying a bar zone, space zone, and working zone may include means for establishing the limits of the range of the first contrasting element and second contrasting element values and defining the working zone as a portion of that range.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
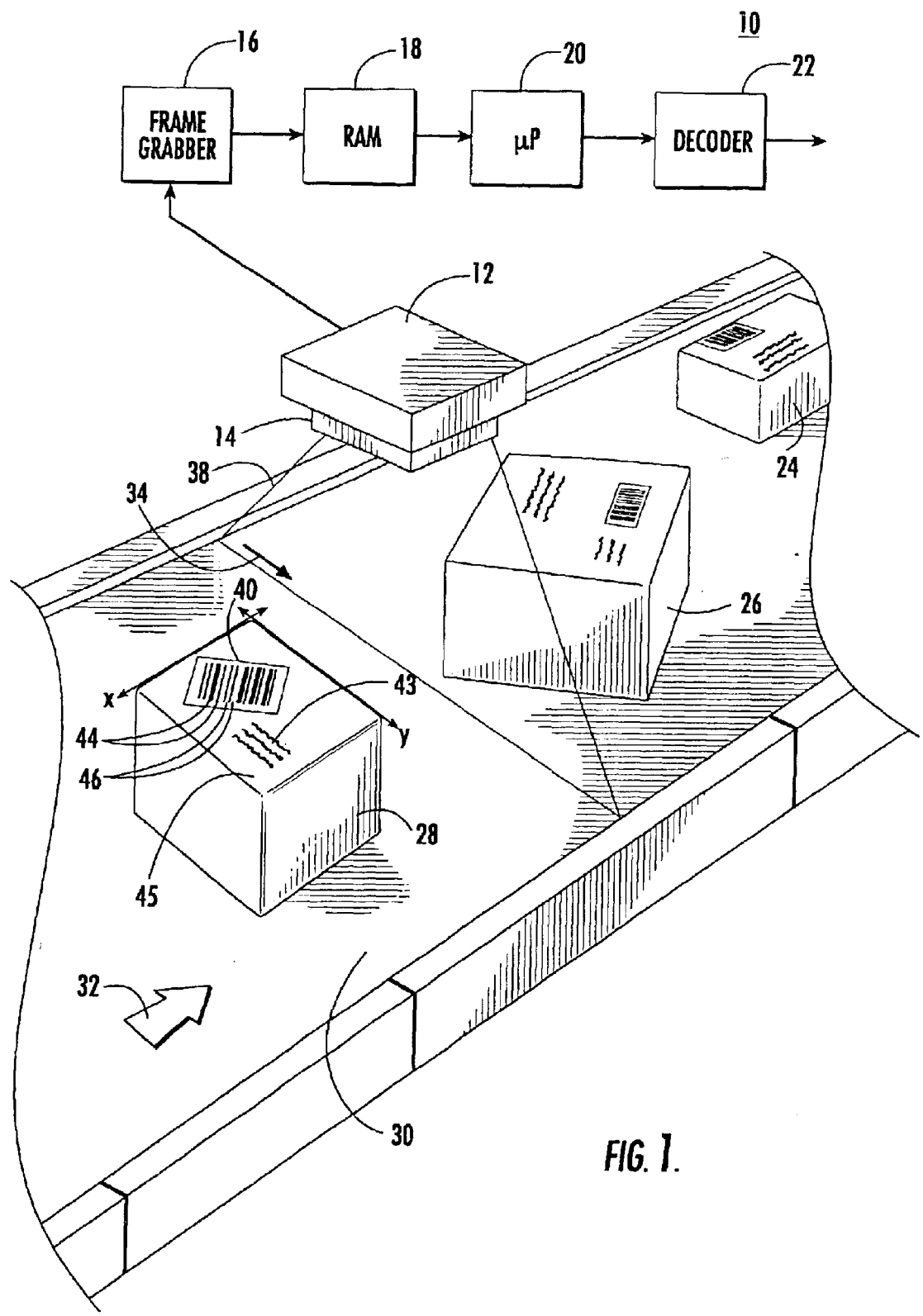
FIG. 1 is a schematic block diagram of a bar code reading system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a bar code detection system 10 including camera 12 with optics 14, frame grabber 16, random access memory (RAM) 18, microprocessor 20, and decoder 22. As packages, such as boxes 24, 26, and 28 are moved along by conveyor 30 in the direction of arrow 32, they encounter linear field of view 34 of a line of CCD sensors, for example, in camera 12. Each package, as exemplified by box 28, includes on its top 45 a bar code label 40. As box 28 moves along in the direction of arrow 32 with the conveyor through linear field of view 34, a two dimensional image is constructed which is acquired by frame grabber 16 from camera 12. The image is buffered in RAM 18 from which the pixel data is operated on by microprocessor 20 which must identify and locate the bar code 40 determine its orientation, interpret the pixel data contained in the bar code bars and spaces and then provide it in proper form to decoder 22.

This invention assumes that the system has identified the bar code and its location and orientation and is concerned rather with obtaining a faster, more accurate measurement of the bar code elements. The method of this invention is typically carried out by and the system according to this invention is typically implemented in microprocessor 20 using RAM 18 and configured with the software programs to operate as explained herein.

Bar code 40 includes a plurality of bar code elements namely black bars 44 and white spaces 46. In this particular bar code 40, bars 44 may have two widths, wide or narrow. And, spaces 46 may have two widths, wide and narrow. This, however, is not a necessary limitation of the bar code or of this invention. The bar code may have any combination of elemental widths. Further, the contrasting elements need not be black and white and need not even be a kind of bar code. They could be colored such as red and blue. They could be retroreflective and non-retroreflective. They could be magnetic and non-magnetic. In addition, the contrasting elements are not limited to just two. For example, they could be black, white and gray, or black, white and two shades of gray, or red, blue and green, or red, blue, green and yellow. By bar code is meant all kinds of bar codes including e.g. two dimensional and stacked as well as the one dimensional type in the example of this disclosure. Further, the invention is not limited to bar codes but applies as well to any set of contrasting elements.

Figure 2:
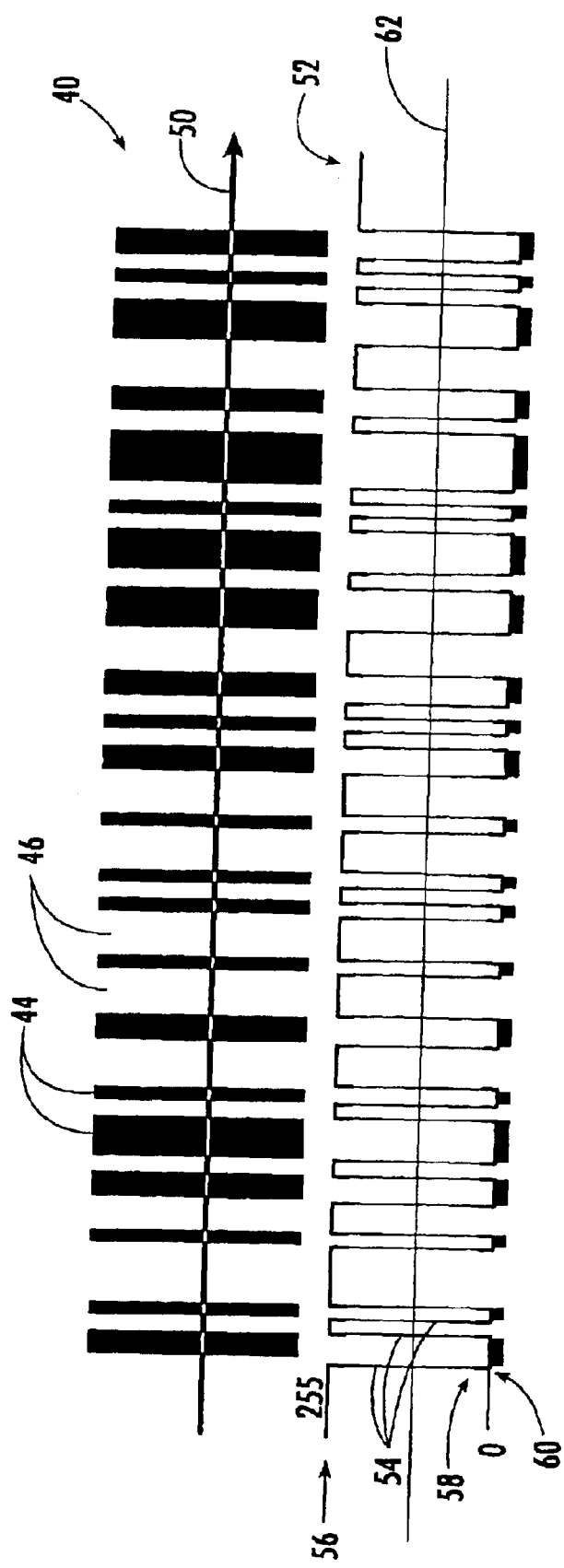
FIG. 2 is a diagrammatic view showing the scanning of a bar code and the corresponding idealized grayscale profile.
Figure 3:
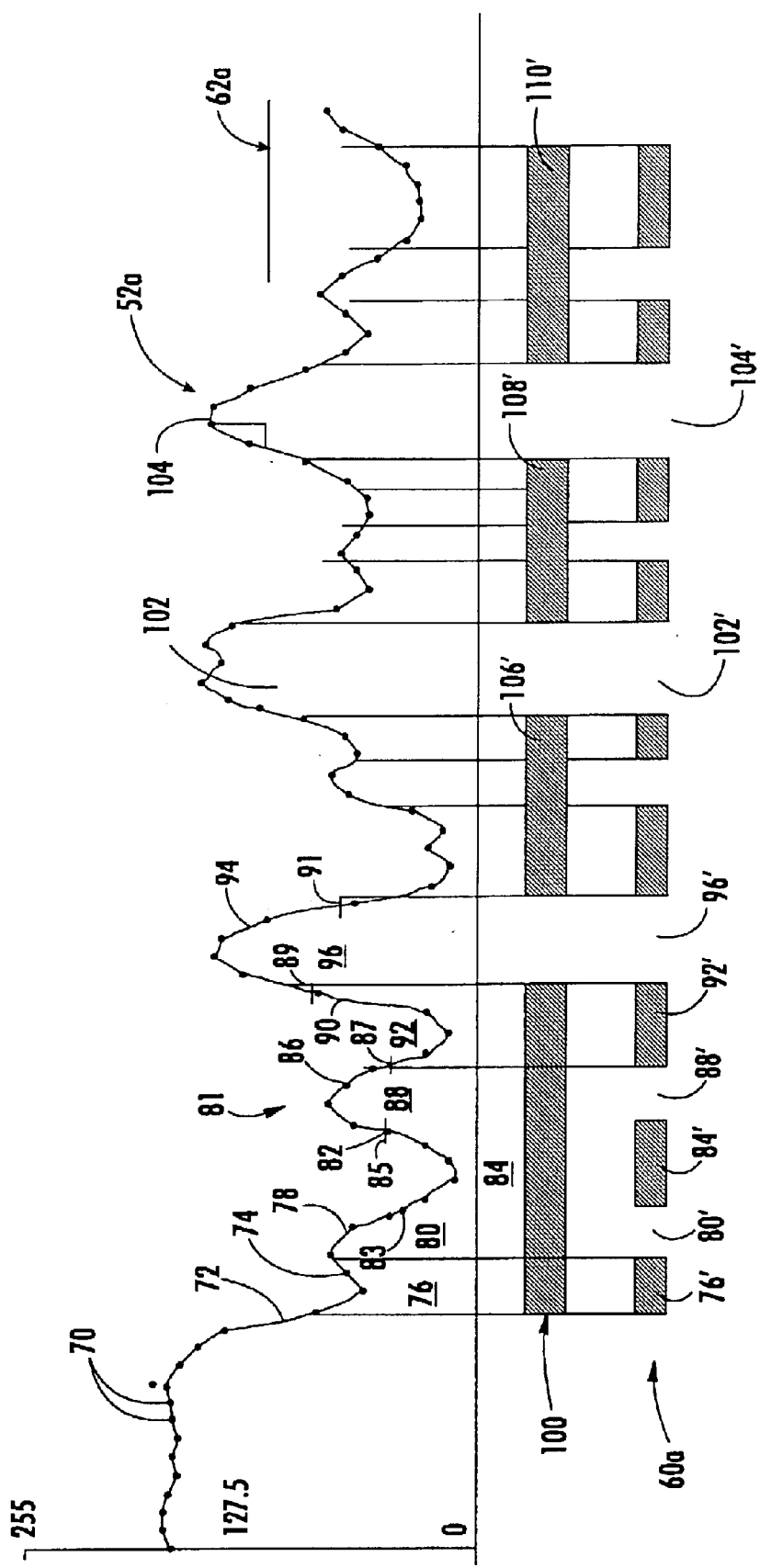
FIG. 3 is an illustration of a bar code gray scale profile with a prior art single threshold detection.

A scan of bar code 40 along scan line 50, FIG. 2 ideally produces a profile 52 with clean, sharp transitions and easily distinguishable white 56 (225) and black 58 (0) values resulting in a reliable line of code output 60. A simple threshold 62 midway between the white 56 and black 58 values would serve to separate white values 56 representing spaces 46 from black values 58 representing bars 44. However, this is only an idealized representation. In the real world, the profile appears more as shown by 52a, FIG. 3. Where data 70 is plotted on the x-axis along the scan path and on the y-axis in accordance with the gray scale value between black 0 and white 255. Negative slope 72 followed by positive slope 74 identifies area 76 as a bar or black whereas positive slope 74 followed by negative slope 78 identifies space 80 as a space. Negative slope 78 followed positive slope 82 indicates area 84 as a black bar. Positive slope 82 followed by negative slope 86 indicates area 88 is a white space. Negative slope 86 followed by positive slope 90 indicates that area 92 is a black bar. Positive slope 90 followed by negative slope 94 indicates that area 96 is a white space, and so on. So that the code 60a should be a black bar 76', white space 80', black bar 84', white space 88', black bar 92' and white space 96' and continuing along profile 52a. However, if a single threshold 62a is set at 127.5 midway between 0 and 255, it can be seen that none of the black bars, 76', 84', or 92' can be distinguished: rather, just one large black bar 100 will be detected and black bars 76', 84', 92' along with white spaces 86', 88' will be lost. In fact, the only white spaces that will be seen will be 96, 102, and 104: thereby identifying only white spaces 96', 102' and 104' amidst the false reading black bars 106', 108', and 110'. A floating threshold 81 set at the midway points 83, 85, 87, 89, 91 between successive peaks and valleys gives a less inaccurate result but still is insufficient in many cases.

Figure 4:
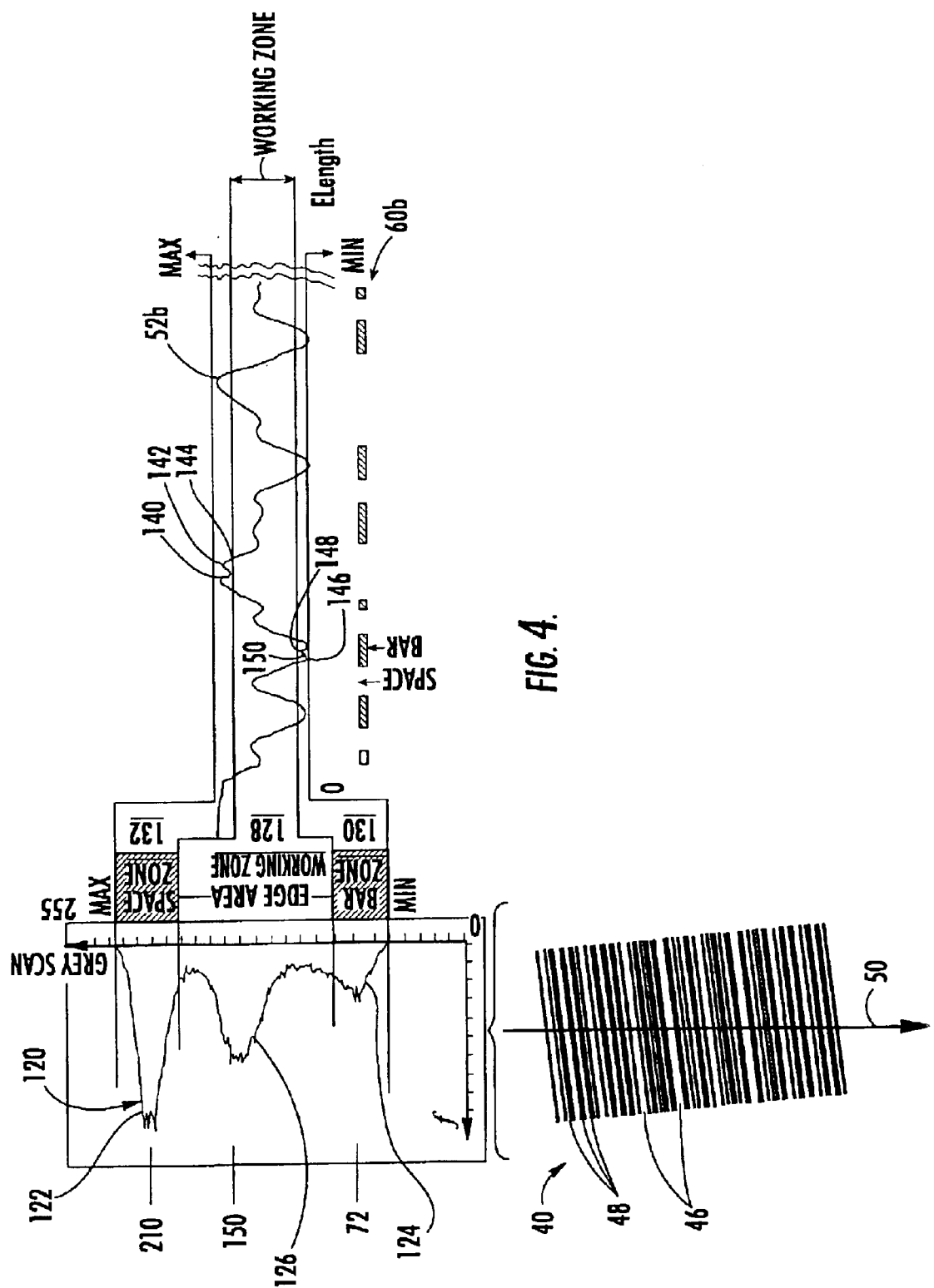
FIG. 4 is a schematic diagram of a scanned bar code, the histogram of its grayscale profile, the bar, space and working zones derived therefrom, and a segment of the code recovered according to this invention.

In accordance with this invention, a histogram of the intensity level distribution, 120, FIG. 4 is derived from the grayscale profile 52b resulting from the scanning of bar code 40. It can be seen that the intensity level distribution peaks around 210 for white space area 122 around 72 for the black bar area 124, and around 150 for gray transition area 126. From the histogram it can also be seen that the bar zone is from 0–91, the gray zone from 92–203 and the space zone is 203–255. The three zones are derived from the histogram data and then the task is to apply these zones to grayscale profile 52b and accept only those transitions which occur in working zone 128, while rejecting those that do not. In addition, any apparent black bars which occur in white space zone 132, as well as white spaces which occur in the black bar zone 130 will be rejected. For example, the negative going slope 140, followed by the positive going slope 142 would indicate that the pixels in the area of 144 indicate a black bar, but since transitions 140 and 142 did not take place in working zone 128 and since further black pixel area 144 would be located in white space zone 132, this data is properly rejected. Similarly, because of positive going slope 146 and negative going slope 148, the pixel area 150 might be perceived as a white space. However, because the white space is occurring in a black bar zone 130, and because the positive going transition slope 146 and negative going slope 148 do not occur in the working zone 128, this data is properly rejected.

Figure 5:
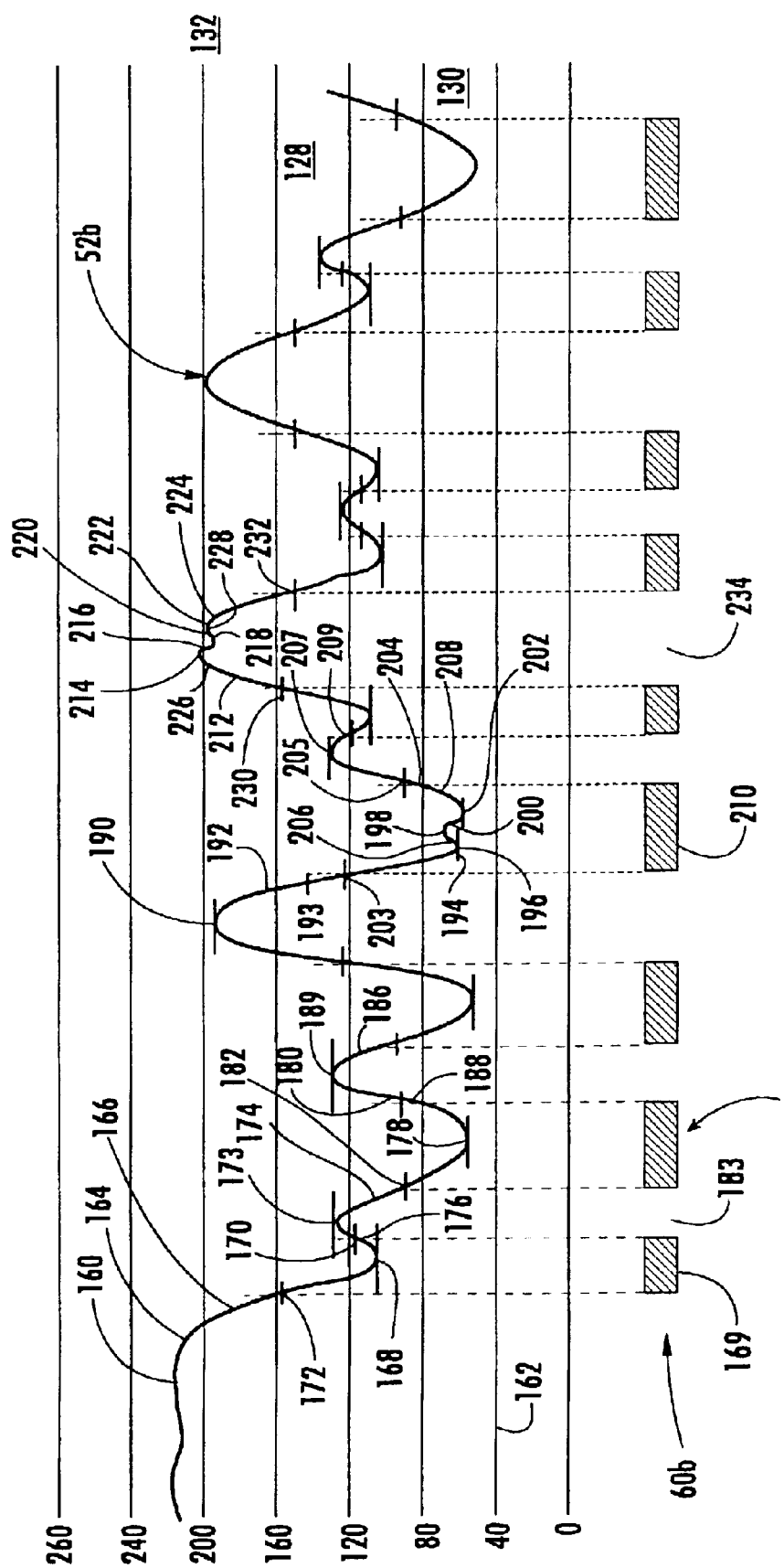
FIG. 5 is an illustration of a grayscale profile of a bar code scan and the bar, space and working zones derived therefrom employing another technique according to this invention.

Analysis of the intensity level distribution (histogram) is just one way of deriving the bar zone, working zone, and space zone. For example, in another approach, the maximum level 160, FIG. 5 and the minimum level 162 can be determined from the grayscale profile and then calculated as follows:

$$Limit_H = \max - \left(\frac{\max - \min}{4}\right) - \left(\frac{\max - \min}{8}\right) \quad (1)$$

And the lower limit can be calculated as:

$$Limit_L = \min + \left(\frac{\max - \min}{8}\right) \quad (2)$$

In this way the zones 128, 130, and 132 are calculated without using the gray scale distribution or a histogram.

In operation, transitions are detected by monitoring slope reversals and identifying a transition as occurring midway between successive slope reversals. For example, bar code profile 52b, FIG. 5, experiences a change in slope at point 164, defined for example as a change by four or greater. This identifies negative going slope 166. At point 168 when negative going slope 166 reverses and changes to positive going slope 170 there are two successive slope reversals, one at 164 and one at 168. Therefore a transition is defined as occurring midway between the two at 172. Since transition 172 is within the working zone 128, it is confirmed as a valid transition. At point 173, slope 170 reverses and becomes negative going slope 174. Now another transition 176 can be identified midway between point 173 of one slope reversal and point 168 at the previous slope reversal. Again transition 176 is within working zone 128 so it is considered valid. The points between 172 and 176 can be identified as a black bar 169. Negative slope 174 reverses at 178 to positive going slope 180. Another transition can now be defined at the midway point between 178 and 173, transition 182. Since transition point 182 is in the working zone 128, it is considered a valid transition: the points between 176 and 182 can be identified as a white space 183. This continues: when positive slope 180 reaches point 184, it reverses to negative slope 186 and the midpoint between point 184 and 178 can be identified as transition 188. Now since transition point 188 is within the working zone it is considered valid: the points between transition points 182 and 188 are considered black bars 185.

This invention not only confirms valid transitions between white spaces and black bars, but also rejects those which are not valid. For example, at point 190, the slope reverses and negative slope 192 begins. At point 194 the slope reverses and positive slope 196 occurs. At point 198 positive slope 196 reverses into negative slope 200. At point 202 negative slope 200 reverses and become positive slope 204; at point 207, positive slope 204 reverses into negative slope 209. Without this invention, a transition would be found midway between point 190 and point 194, transition 193, a second transition midway between points 194 and 198, transition 206, a third transition midway between points 198 and 202, transitions 208 and a forth transition midway between points 202 and 207, transition 205. The points between transitions 193 and 206 would be considered a black bar, the points between transitions 206 and 208 would be considered a white space and the points between transitions 208 and 205 would be considered a black bar. However, the transition 206 and the transition 208 are both out of working zone 128 and in fact are in black bar zone 130. Neither of these transitions are therefore acceptable and so instead of reading an erroneous black, white, black, as might be caused by, signal noise, a smudge of white or a highly specular region at 198, the system defines the real transition 203 as the mid point between point 190 and point 202. Therefore the entire excursion between transition points 203 and 205 is seen as a black bar 210. Therefore, the system accepts only transitions 203 and 205 which correctly recognizes only the single black bar 210.

System noise or a black smudge might cause a similar occurrence in the white space zone 132, for example, where positive going slope 212 at point 214 reverses slope to negative slope 216 which in turn at point 218 reverses to positive slope 220 and again at point 222 reverses slope to negative slope 224. Here it would appear that transition points 226 and 228 define the edges of a black bar, but in fact, they do not since transition 226 and transition 228 are both out of the working zone and in the white space zone 132. They will therefore be rejected as invalid transitions, and do not define a black bar within a white space and the system will simply accept only the transitions 230 and 232 which confirms the local profile as single white space 234.

Figure 7:
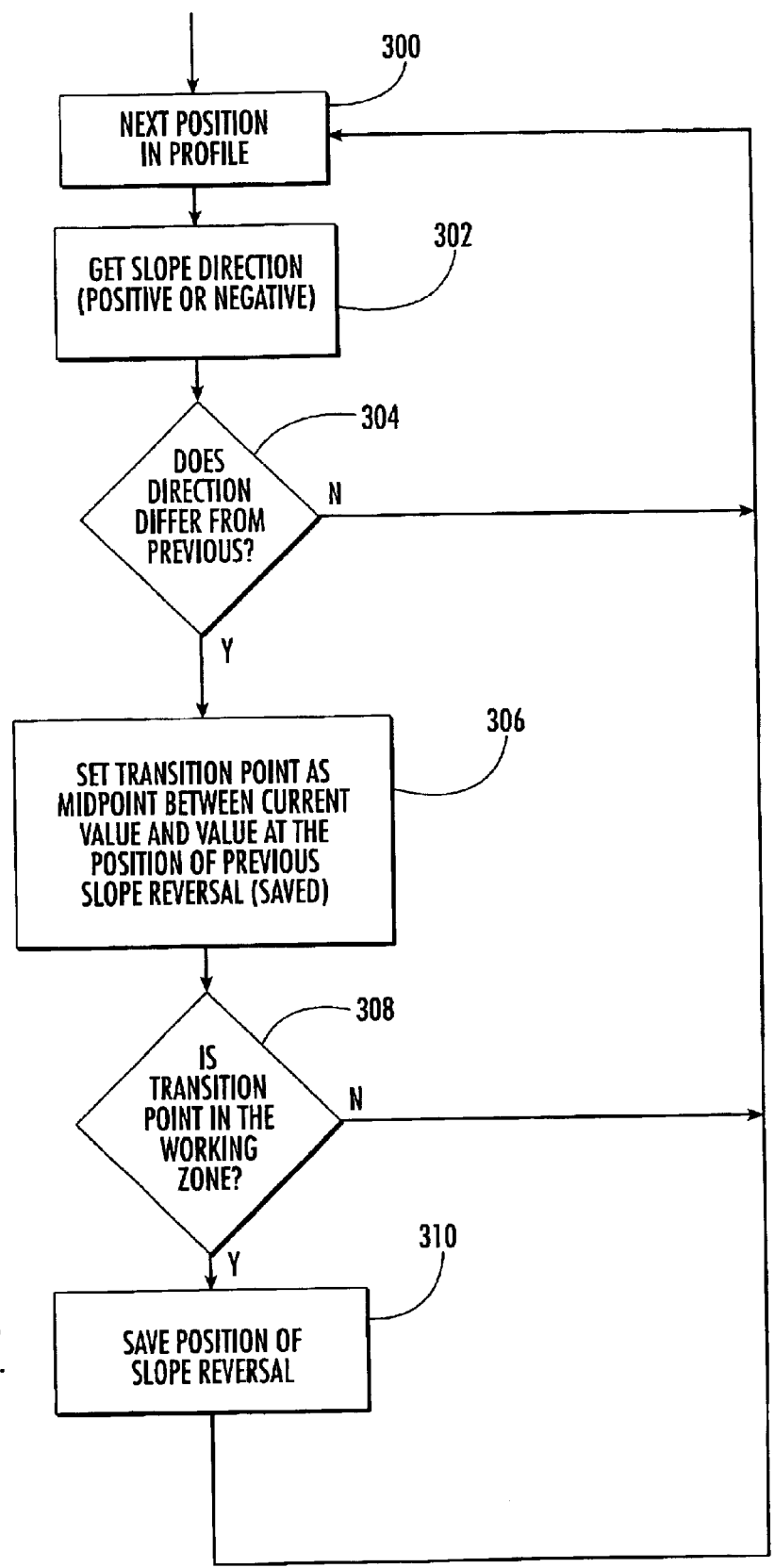
FIG. 7 is a flow chart of the steps for determining the transition points according to this invention.

The steps for determining transition points include finding the next position in the profile, 300, FIG. 7, then getting the slope direction, 302. Next, it is determined whether the direction differs from the previous direction, 304. If it does not, the system returns to step 300. If it does, the transition point is then set at the midpoint between the current value and the value of the position of the previous slope reversal 306 which has been saved. After this the query is made as to whether the transition point is in the working zone, 308. If it is not, the system returns to step 300. If it is, the position of the slope reversal is saved, 310 and the system goes to the next point in the profile, step 300.

Figure 6:
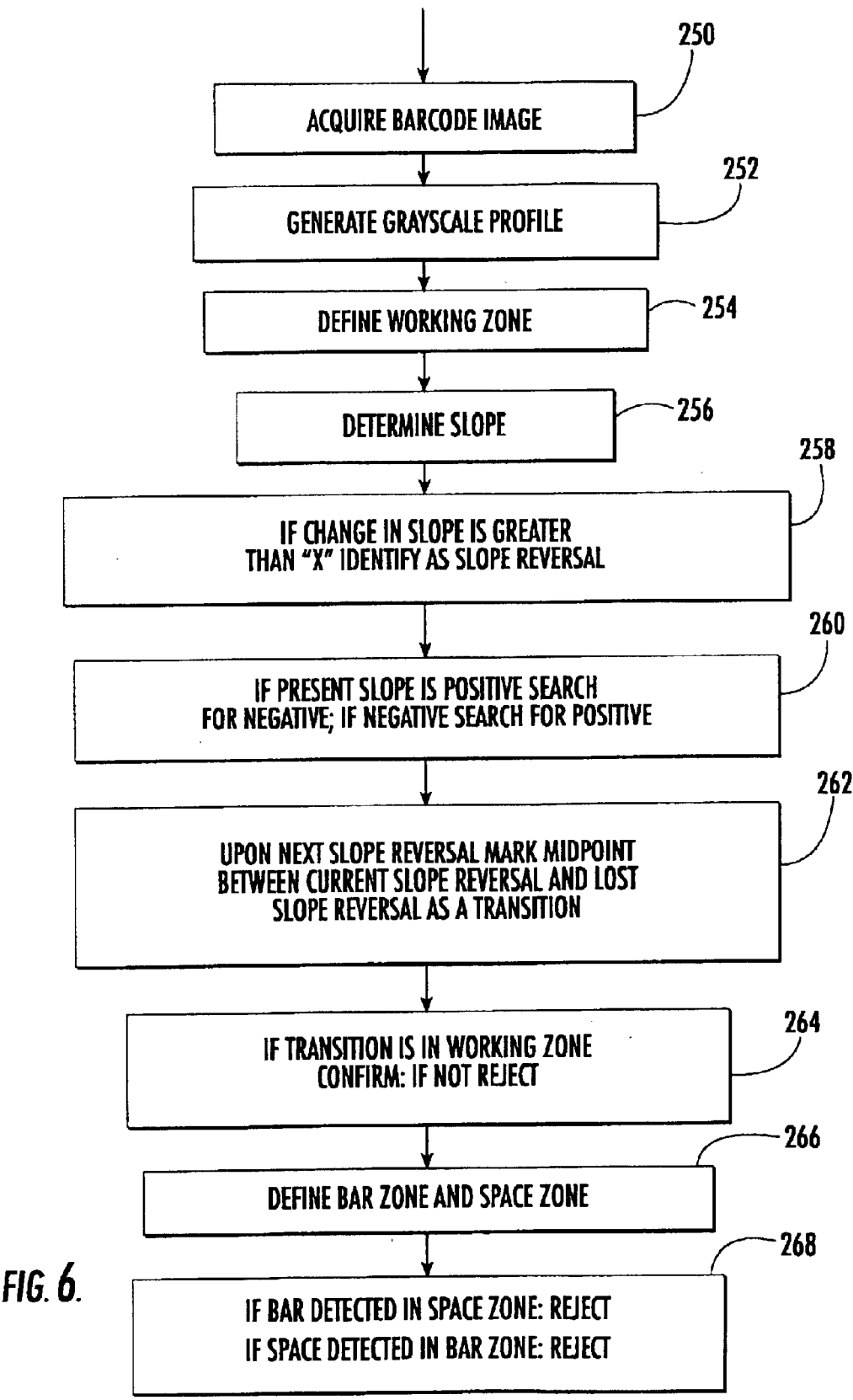
FIG. 6 is a flow chart of the primary steps associated with one embodiment of the method of this invention.

In one embodiment, the method of this invention includes acquiring the bar code image 250, FIG. 6, generating its grayscale profile 252, and defining the working zone 254. Then, by examining adjacent values of the profile, the slope between them is determined. If the change in slope is greater than some value x, for example 4, it is identified as slope reversal 250. The value of 4 was chosen because it produced the best results from a database of samples. The goal was to find the minimum value of x that would find all edges in the test database without producing false ones. This number worked best for the instant system (camera, lighting, etc.). In the next operation, 260, if the present slope is positive, it searches for a negative, if it is negative its searches for a positive. The system then looks for a slope reversal in step 262 and marks the midpoint between the current slope reversal and the last slope reversal as a transition. In step 264 if the transition is in the working zone it is confirmed as valid, if not it is rejected.

While in the specific example there are two data zones, bar and space and one working zone, this is not a necessary limitation of the invention. With three data zones there could be three working zones, with four data zones there could be four working zones and so on.

The preferred method according to this invention is carried out by microprocessor 20 configured by software to effect each of the steps according to the invention. The preferred system according to this invention includes means in the form of software routines carried out by the configuring software in the microprocessor according to FIGS. 6 and 7.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A method of verifying bar code readings comprising:
   generating a profile of a bar code;
   identifying a bar zone of values representing bars, a space zone of values representing spaces, and a working zone of values representing transitions between the bars and spaces, in which identifying the bar zone, the space zone and the working zone includes generating a histogram of the intensity value distribution from said profile and classifying bar zone values, space zone values and working zone values corresponding to the histogram;
   detecting a change of a value in the bar code profile indicative of an apparent transition; and
   confirming the apparent transition as a true transition if it occurs in the working zone and rejecting it if it occurs in the bar or space zone.

2. The method of verifying bar code readings of claim 1 including detecting a portion of a bar code profile indicative of a bar and rejecting as a bar if it occurs in said space zone.

3. The method of verifying bar code readings of claim 1 including detecting a portion of a bar code profile indicative of a space and rejecting it as a space if it occurs in said bar zone.

4. The method of verifying bar code readings of claim 1 in which said profile is a grayscale profile.

5. The method of verifying bar code readings of claim 1 in which detecting a change in the bar code profile indicative of an apparent transition includes sensing first and second successive slope reversals and defining the apparent transitions midway between said slope reversals.

6. The method of verifying bar code readings of claim 1 in which identifying a bar zone, space zone and working zone includes establishing the limits of the range of the bar and space values and defining said working zone as portion of that range.

7. A method of verifying readings of contrasting elements comprising:
   generating a profile of the contrasting elements;
   for each type of contrasting elements, identify a zone of values representative thereof;
   identifying at least one working zone of values representing transitions between contrasting elements, in which identifying the at least one working zone includes generating a histogram of the intensity value distribution from said profile and classifying working zone values corresponding to the histogram;
   detecting a change of a value in the profile indicative of an apparent transition between the contrasting elements; and
   confirming the apparent transition as a true transition if it occurs in a working zone and rejecting it if it occurs in any other zone.

8. The method of verifying reading of contrasting elements of claim 7 including detecting a portion of a profile indicative of a first contrasting element and rejecting it if it occurs in said second zone.

9. The method of verifying reading of contrasting elements of claim 7 including detecting a portion of a profile indicative of a second contrasting element and rejecting it if it occurs in said first zone.

10. The method of verifying reading of contrasting elements of claim 7 in which said profile is a grayscale profile.

11. The method of verifying reading of contrasting elements of claim 7 in which detecting a change in the bar code profile indicative of an apparent transition includes sensing first and second successive slope reversals and defining the apparent transitions midway between said slope reversals.

12. The method of verifying reading of contrasting elements of claim 7 in which identifying a working zone includes establishing the limits of range of first contrasting element and second contrasting element values and defining said working zone as a portion of that range.

13. A system for verifying bar code readings comprising:
means for generating a profile of a bar code;
means for identifying a bar zone of values representing bars, a space zone of values representing spaces, and a working zone of values representing transitions between the bars and spaces, said means for identifying the bar zone, the space zone and the working zone including means for generating a histogram of the intensity value distribution from said profile and identifying bar zone values, space zone values and working zone values corresponding to the histogram;
means for detecting a change of a value in the bar code profile indicative of an apparent transition; and
means for confirming the apparent transition as a true transition if it occurs in the working zone and rejecting it if it occurs in the bar or space zone.

14. The system for verifying bar code readings of claim 13 including in which the means for detecting detects a portion of a bar code profile indicative of a bar and rejects it as a bar if it occurs in said space zone.

15. The system for verifying bar code readings of claim 13 including in which the means for detecting detects a portion of a bar code profile indicative of a bar and rejects it as a space if it occurs in said bar zone.

16. The system for verifying bar code readings of claim 13 in which said means for generating a profile generates a grayscale profile.

17. The system for verifying bar code readings of claim 13 in which said means for detecting a change in the bar code profile indicative of an apparent transition includes means for sensing first and second slope reversals and means for defining said apparent transition midway between said slope reversals.

18. The system for verifying bar code readings of claim 13 in which said means for identifying a bar zone, space zone and working zone includes means for establishing the limits of the range of the first contrasting element and second contrasting element values and defining said working zone as a portion of that range.

19. The system for verifying bar code readings of claim 13 in which said means for identifying a bar zone, space zone and working zone includes means for establishing the limits of the range of the bar and space values and defining said working zone as a portion of that range.

20. A system of verifying readings of contrasting elements comprising:
means for generating a profile of the contrasting element;
means for identifying a first zone of values representing first contrasting element, a second zone of values representing a second contrasting element, and a working zone of values representing transitions between the contrasting elements, said means for identifying the first zone, the second zone and the working zone includes means for generating a histogram of the intensity value distribution from said profile and identifying first zone values, second zone values and working zone values corresponding to the histogram;
means for detecting a change of a value in the profile indicative of an apparent transition between said contrasting elements; and
means for confirming the apparent transition as a true transition if it occurs in the working zone and rejecting it if it occurs in the first or second zones.

21. The system for verifying readings of contrasting elements of claim 20 in which said means for detecting detects a portion of a profile indicative of a first contrasting element and rejects it as a first contrasting element if it occurs in said second zone.

22. The system for verifying readings of contrasting elements of claim 20 in which said means for detecting detects a portion of a profile indicative of a first contrasting element and rejects it as a second contrasting element if it occurs in said first zone.

23. The system of verifying bar code readings of claim 20 which said profile is a grayscale profile.

24. The system of verifying bar code readings of claim 20 in which said means for detecting a change in the bar code profile indicative of an apparent transition includes means for sensing first and second successive slope reversals and means for defining the apparent transitions midway between said slope reversals.

* * * * *